United States Patent [19]

McCluskey

[11] 4,284,060

[45] Aug. 18, 1981

[54] FLOATING SOLAR POOL HEATER

[75] Inventor: James E. McCluskey, Pipersville, Pa.

[73] Assignee: Philadelphia Rivet Company, Doylestown, Pa.

[21] Appl. No.: 160,826

[22] Filed: Jun. 18, 1980

[51] Int. Cl.³ .............................................. F24J 3/02
[52] U.S. Cl. ...................................... 126/415; 4/498
[58] Field of Search ............... 126/415, 416, 450, 441, 126/438, 439; 4/498, 499, 503; 9/11 A, 2 A; 220/216, 218

[56] References Cited

U.S. PATENT DOCUMENTS

| | | | |
|---|---|---|---|
| 3,072,920 | 1/1963 | Yellott | 126/415 |
| 3,872,522 | 3/1975 | Bennett et al. | 4/498 |
| 3,893,443 | 7/1975 | Smith | 126/415 |
| 3,984,881 | 10/1976 | Gerlach | 126/415 |
| 3,984,882 | 10/1976 | Forman | 126/415 |
| 3,998,204 | 12/1976 | Fuchs et al. | 126/415 |
| 4,022,187 | 5/1977 | Roberts | 126/415 |
| 4,033,326 | 7/1977 | Leitner | 126/415 |
| 4,090,496 | 5/1978 | Mallot | 126/415 |
| 4,146,015 | 3/1979 | Acker | 126/415 |

FOREIGN PATENT DOCUMENTS 2710313 9/1978 Fed. Rep. of Germany .......... 126/415

Primary Examiner—Daniel J. O'Connor
Attorney, Agent, or Firm—Z. T. Wobensmith, 2nd; Z. T. Wobensmith, III

[57] ABSTRACT

A floating solar heater for swimming pools is disclosed which includes a top cover, a vertical outer side wall with inclined inner side wall segments connected thereto, an outside rim and a bottom wall. The inner side wall segments are octagonal, coated with light reflective material, and aid in reflecting the sun's rays to heat the space inside the walls formed by the cover which dead air space also provides for floatation of the heater. The bottom wall is heated by direct sun impingement and by the air in contact with it and is formed of a material having high heat conductivity.

4 Claims, 2 Drawing Figures

FLOATING SOLAR POOL HEATER

BACKGROUND OF THE INVENTION

1. Field of the Invention

A solar heater of the floating passive type is provided for use in heating pool water.

2. Description of the Prior Art

With the large investment that a swimming pool owner makes in his pool it is desirable to extend the use of the pool into the spring and fall seasons as much as possible. Many heaters are available that use oil and gas but the cost of operation has become prohibitive.

Various types of solar heaters have been proposed, many of which are permanent installations with coils of pipe and which require pumps to effectively circulate the heated water since gravity systems are not satisfactory, and which are therefore expensive to operate.

Other expedients have been attempted such as using a pool cover for heat collection as shown in the U.S. Pat. to Yellot, No. 3,072,920 which cover includes a sheet of plastic material with a reflective surface on one side and an absorptive surface on the other with a plurality of air pockets formed by a mattress like arrangement attached thereto. The cover is supposed to reflect or to collect heat depending on which surface is presented to the sun. The cover is difficult to use, must be removed from the pool before the pool can be used, is expensive as it must be custom made for each pool and is not energy efficient.

The U.S. Pat. to Smith, No. 3,893,443 illustrates a floating solar pool heater of the pan type with a top cover and a flat dish or pan attached thereto, with interior surfaces painted black to absorb the sun's rays and pass them to the water. The Smith structure is rectangular in configuration which limits its use in many pools, does not provide for efficient heat collection and transmission to the water, and suffers from other shortcomings.

The U.S. Pat. to Roberts, No. 4,022,187 shows a floating solar heater for swimming pools which covers the entire surface of the pool and includes a plurality of air filled units each including a top and bottom panel of plastic material with the top panel transparent and the bottom sheet or panel opaque, the bottom sheet being carried by a rigid frame. The Roberts structure is awkward to use, must be custom fitted to each pool, must be removed from the pool before the pool can be used, is not energy efficient and suffers from other shortcomings.

The U.S. Pat. to Leitner, No. 4,033,326 shows an inflatable solar collector for swimming pools which includes a plurality of heating sections each having an upper transparent portion and a lower portion for absorption. When inflated the upper and lower portions intersect at at least two locations so that the angles therebetween are about 40° to 70°. The Leitner structure is expensive, bulky, awkward to use, requires a source of air for inflation before use, is not energy efficient and suffers from other shortcomings.

The U.S. Pat. to Mallet, No. 4,090,496 illustrates compounds for forming bodies for heat generation from light and solar panels therefor. The Mallet structure illustrates heaters formed of the compounds described therein including, in FIGS. 3 and 4, dome like collector panels with plates 31 or 41 molded of the compound with a transparent dome 32 or 43 attached thereto at the edges. The device of FIG. 3 is supposed to float on the top surface of the water while the device of FIG. 4 is submerged. The Mallet structures are costly to manufacture, awkward to use, subject to water leaks, and the embodiments, other than that of FIG. 3, must be taken out of the water before the pool can be used and suffer from other shortcomings.

The U.S. Pat. to Acker, No. 4,146,015 illustrates a solar pool heater which includes a submersible tubular ring attached to the perimeter of a floating sheet. The sheet has a plurality of captive air bubbles for floatation while insulating the water surface from ambient air. The sheet is transparent to supposedly allow the sun's rays to pass through and heat the water. The Acker structure is awkward to use, expensive, must be custom fitted to each pool, must be removed from the pool before the pool can be used, is not energy efficient and suffers from other shortcomings.

The pool heater of my invention is inexpensive, does not require removal from the pool for pool use, can be used in pools of varying configurations and is energy efficient.

SUMMARY OF THE INVENTION

In accordance with the invention a floating solar pool heater is provided which includes an outer rim, outer side walls connected to the rim, inclined inner side walls connected to the outer walls, a transparent top cover and a heat conducting bottom wall.

The principal object of the invention is to provide a floating solar pool heater that is energy efficient.

A further object of the invention is to provide a floating solar pool heater that is easy to construct.

A further object of the invention is to provide a floating solar pool heater that can be easily put into and taken out of the pool in any desired numbers.

A further object of the invention is to provide a floating solar pool heater that is compatible with pools of varying configuration.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Figure 1:
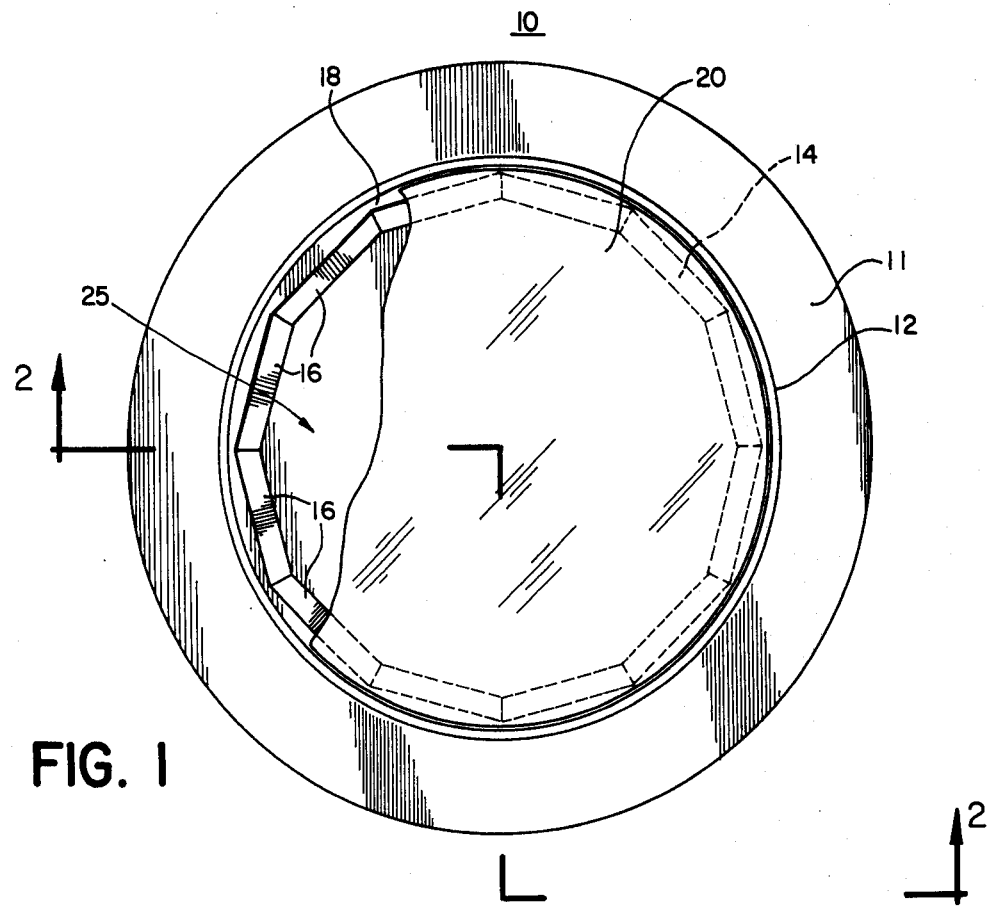
FIG. 1 is a top plan view of the heater of the invention partly broken away and dotted to show the details of interior construction.
Figure 2:
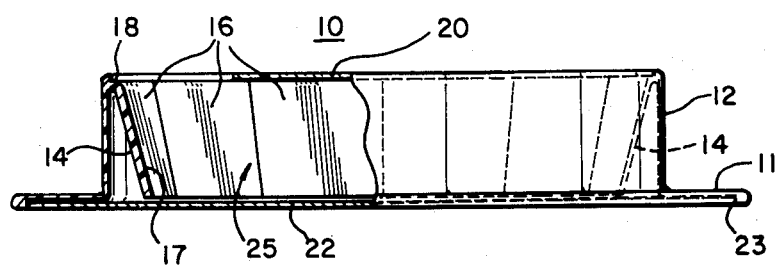
FIG. 2 is a vertical sectional view taken approximately on the line 2—2 of FIG. 1.

Referring now more particularly to the drawings the heater 10 is illustrated as of generally circular overall shape, as seen from the top, with a flat outer perimeter rim 11, and a vertical outer side wall 12 connected thereto and extending therearound. An inner wall 14 is provided connected to outer side wall 12 below its uppermost point as shown in FIG. 2 and extending downwardly and inwardly of wall 14 at an angle of approximately 20°.

The inner side wall 14 is composed of a number of segments 16 so that the interior wall 14 is octagonal in appearance and form.

The segments 16 are coated with any suitable material 17 that is reflective in nature, the octagonal configuration thereby improving the heating properties of the structure.

The outer wall 12 is provided with a flat portion 18 depressed above its meeting point with the wall 14 to accommodate a circular cover 20 which is secured thereto in any suitable manner so as to make a fluid tight joint with wall 14. The walls 12, 14 and rim 11 may be formed of any suitable material with acrylic butadiene styrene (ABS) being particularly suitable. The cover 20 may be formed of any suitable material such as transparent or translucent thermo-plastic which permits the sun's rays to pass therethrough A bottom plate 22 is provided of generally circular shape extending under rim 11 and fastened thereto adjacent offset 23 of rim 11 in any suitable manner so as to be water tight.

The bottom plate 22 may be of any suitable heat conductive material with a thin sheet of copper being particularly suitable.

In the preferred embodiment, the solar pool heater has a diameter of approximately 16 inches and a height of approximately 3 inches, but can be larger or smaller as desired.

In use, the heater 10 is placed in a pool (not shown) where it floats in the water. The sun's rays pass through cover 20 and strike surfaces 17 of segments 16 heating the enclosed space 25 inside of walls 14, and the sun's rays also strike the bottom plate 22 and heat it which heat is transferred to the pool water. The configuration of the inner wall segments 16 and the high heat conductivity of the bottom plate 22 serve to provide an energy efficient structure that retains the heat and heats the pool water on which it floats.

It should be noted that one or more of the pool heaters can be used as desired, can be easily put in and taken out of the pool and require no maintenance by the user.

I claim:

1. A floating solar pool heater which comprises a body having
    an outer rim,
    a vertical wall extending upwardly from said rim,
    an angularly inclined inner wall attached to and extending downwardly and inwardly of said outer wall,
    a transparent cover extending over the top of the outer wall and secured thereto,
    said inner wall being formed of non-circular segments and having a reflective coating thereon, and
    a heat conducting bottom plate attached to said rim and forming with said cover and said walls an enclosed space.

2. A floating solar pool heater as defined in claim 1 in which
    said cover is of thermo-plastic material.

3. A floating solar pool heater as defined in claim 1 in which
    said walls and said rim are formed of synthetic plastic material.

4. A floating solar pool heater as defined in claim 1 in which
    said bottom plate is formed of a sheet of copper.

* * * * *